United States Patent [19]

Agsten

[11] 4,036,916
[45] July 19, 1977

[54] WIND DRIVEN ELECTRIC POWER GENERATOR

[76] Inventor: Carl F. Agsten, 1539 Bedford Road, Charleston, W. Va. 25314

[21] Appl. No.: 584,193

[22] Filed: June 5, 1975

[51] Int. Cl.² .......................... B01F 3/04; F03D 7/02
[52] U.S. Cl. .......................... 261/109; 261/DIG. 11; 415/2; 416/132 B; 416/194
[58] Field of Search .................. 261/109–112, 261/DIG. 11, DIG. 77; 238/127, 139; 290/44, 55, 45, 54; 415/2, 4, 140, 141, 3, 198; 416/41, 87, 132, 189, 192, 193, 227, 229, 233, 240, 194; 417/14, 213, 334; 104/99, 110; 105/150; 60/398, 641

[56] References Cited

U.S. PATENT DOCUMENTS

| 243,169 | 6/1881 | Sprague | 416/132 |
| 508,478 | 11/1893 | Johnston | 104/99 X |
| 1,072,698 | 9/1913 | Chatterton | 415/198 X |
| 1,112,203 | 9/1914 | Fandrey | 415/2 |
| 1,115,162 | 10/1914 | Berliner | 416/194 |
| 1,321,415 | 11/1919 | Brown | 290/55 X |
| 1,600,105 | 9/1926 | Fonkiewicz | 415/198 X |
| 3,637,193 | 1/1972 | Kugler et al. | 261/DIG. 11 |
| 3,721,290 | 3/1973 | Butler, Jr. | 290/55 X |
| 3,846,519 | 11/1974 | Spangemacher | 261/DIG. 11 |

FOREIGN PATENT DOCUMENTS

| 23,282 | 7/1918 | Denmark | 415/2 |
| 1,086,320 | 2/1955 | France | 415/2 |
| 347,024 | 4/1931 | United Kingdom | 415/2 |
| 192,405 | 8/1923 | United Kingdom | 415/2 |

Primary Examiner—Tim R. Miles
Assistant Examiner—Richard L. Chiesa
Attorney, Agent, or Firm—Clarence A. O'Brien; Harvey B. Jacobson

[57] ABSTRACT

A wind driven electric power generator having a shroud arranged in a path of fluid flow. Within the shroud is disposed a stationary shaft supporting a wind generator assembly. The shroud can be the veil of a conventional cooling tower, with the wind generator assembly including a rotor connected to an electric generator arranged for converting rotary motion of the rotor to electrical energy, thus saving some of the energy created by the natural draft passing up the veil of the cooling tower. Space frame box trusses provided with airfoils provide lightweight arms for the rotor, with the rotor being arranged anywhere in the shroud. When a hyperbolic cooling tower veil is used as the shroud, the rotor will usually be positioned in the throat of the veil.

7 Claims, 7 Drawing Figures

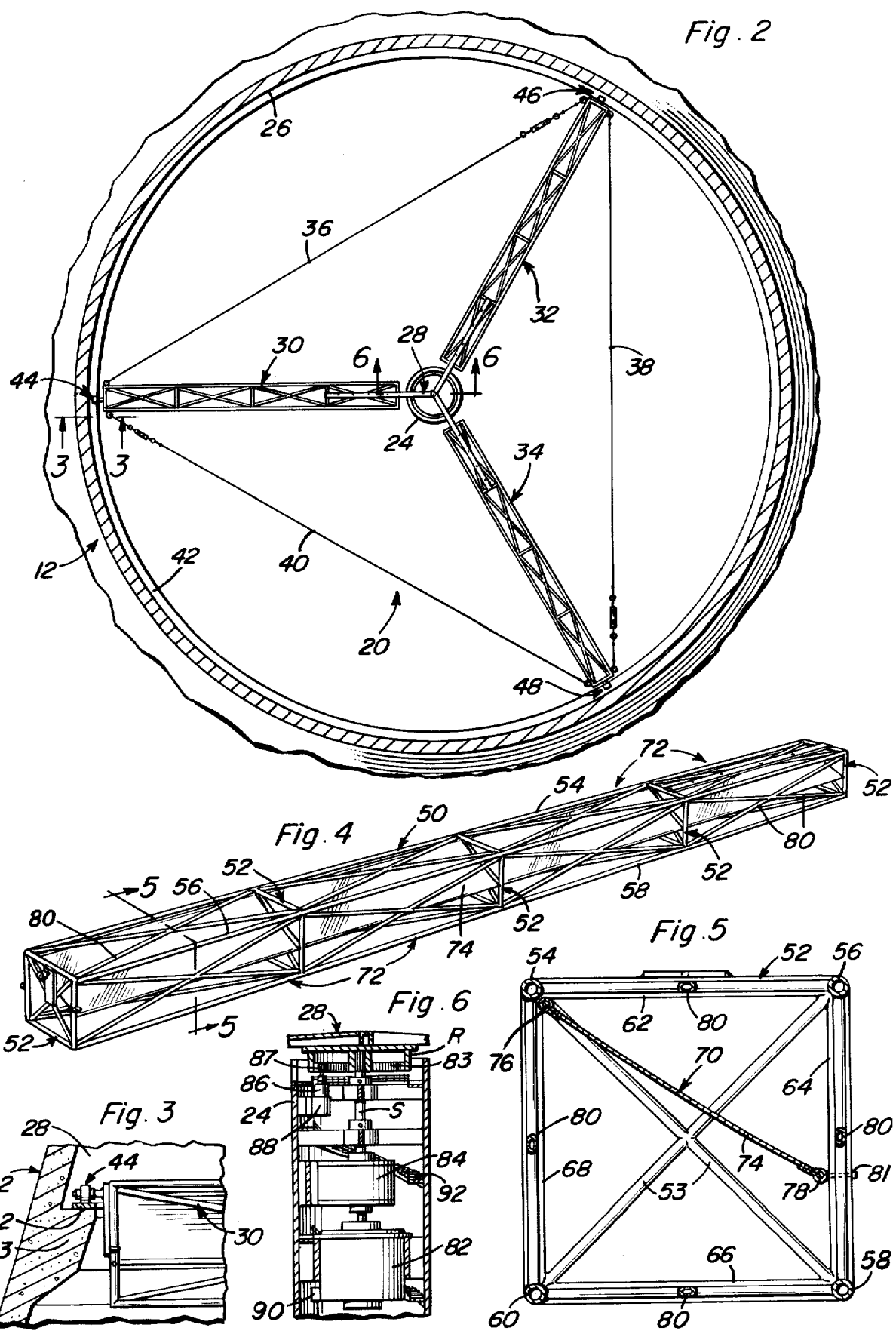

WIND DRIVEN ELECTRIC POWER GENERATOR

BACKGROUND OF THE INVENTION

1. Field of the Invention

This invention relates generally to a wind driven electric power generator, and particularly to a wind driven electric power generator to be locate inside the veil of natural draft cooling towers that have been or are to be built in conjunction with fossil fuel or nuclear powered electric generating plants. This wind driven generator would supplement the electric power generated by the primary generators of the power plant by harnessing the wasted energy that exists in the form of a heavy air mass rising in the cooling tower as an inherent part of the function and operation of the cooling tower.

2. Description of the Prior Art

There are many types of windmills designed specifically for electric power generation. These windmills range in scope from a capacity for a single dwelling up to some rather large units that have been built and function with limited success. Research and planning is being conducted on grand schemes all over the world in search of an answer to the dilemma of inevitable exhaustion of consumable fuels now being used almost exclusively for power generation. This exhaustion includes that of the present limited supply of U-235 uranium.

Among the schemes presently being proposed is to construct windmills 200 feet high and having blades sweeping a 36 foot diameter circle. At wind speeds of, for example, 22 miles per hour, such windmills are capable of producing 35 KW, and even when the wind velocity falls as low as 4.5 miles per hour, such windmills can produce 0.5 KW. It will be appreciated, however, that the locations having the requisite prevailing winds to just such windmills is rather limited.

With all the schemes that now exist or are being researched, there are common problems that must be overcome to make the cost of the generated power within reason. Some of the most major of these problems are:

1. Finding locations where the wind is. Obviously, a windmill should be located where the wind blows most of the time with sufficient force to keep the rotor turning a high percentage of the time. There are locations where this condition exists, but even there the wind is variable and unpredictable and will vary in velocity from, for example, zero to hurricane forces.

2. Structural requirements. Most designs for wind generators have a shaft oriented on a horizontal axis, and the rotors are disposed in a vertical plane. Therefore, the following structural problems must be considered.

a. The supporting tower must be at least as tall as half the diameter of the rotor assembly.

b. The rotor arms must not only support their weight from one end, that end being at the shaft, but must be able to withstand the highest conceivable wind loads, or be retractable in some manner.

c. The lateral forces of the wind load is transferred to the tower, so that the tower must be reinforced to resist this bending moment as well as the weights of all the components.

d. To take the fullest advantage of the available winds, the structure should allow for "weather-vaning" which further complicates structural problems.

3. Storage. The electricity that is generated will fluctuate, and accordingly must be stored in a system that can then release the electricity at a given rate in a controlled fashion. This can be done with batteries, by means of cryogenic systems, compressed air, or fly wheel storage systems, but for an installation of any size, the most common and most practical solution at this time is to use a conventional power grid.

4. Transmission. The final step in converting wind power to electricity is to transmit the power, through a transmission system, to the ultimate consumer.

From the above criteria, it is obvious that to harness wind power with working facilities is a costly business. The larger the facility, the more complex and costly it becomes. The larger rotor diameters are very desirable. The general formula for computing wind power is that the power varies as the cube of the velocity of the air and of circular areas through which it passes. When large facilities which are being considered are constructed, they will most likely be on the ocean, on top of mountain peaks, or on very high towers in the plains regions to be "where the wind is". Therefore, the cost associated with the structure will be great and the storage and transmission costs will also be high, due to the remoteness of the most desirable locations for locating such windmills.

I am aware of the following patents that may be pertinent to the invention:

Nos. 215,035 - May 6, 1879
535,602 - Mar. 12, 1895
1,003,661 - Sept. 19, 1911
1,929,410 - July 9, 1930
3,637,193 - Jan. 25, 1972
3,708,155 - Jan. 2, 1973.

SUMMARY OF THE INVENTION

It is an object of the present invention to provide a wind driven electric power generator system which may be provided in a location that assures a fairly constant wind movement of considerable mass and velocity independent of geographical region in which the system is disposed.

It is another object of the present invention to provide a wind driven electric power generator which will always be located where power grid and transmission network facilities are already available.

It is yet another object of the present invention to provide a wind driven electric power generator which will be shielded from lateral wind loads, thus reducing the structural requirements of the supporting tower of the generator system.

These and other objects are achieved according to the present invention by providing a wind driven electric power generator having: a shroud arranged in a path of fluid flow; a support disposed within the shroud; and a wind generator assembly mounted on the support within the shroud. Preferably, the shroud is a longitudinal sleeve arranged extending vertically, and the support is a vertically extending, stationary, longitudinal shaft disposed substantially centrally within the sleeve. According to an advantageous feature of the present invention, the shroud, or sleeve, is the hyperbolic veil of a natural draft cooling tower.

The wind driven generator assembly advantageously includes a rotor having a rotor hub rotatably mounted on the shaft and at least one rotor arm connected to the rotor hub and extending longitudinally from the rotor hub to the inner wall surface of the associated shroud.

According to an especially advantageous feature of the present invention, the inner wall surface of the shroud is provided with a circular track around the axis formed by the shaft and opposite the rotor hub, and a trolley is mounted on the rotor arm at an end thereof spaced from the rotor hub. The trolley is preferably arranged engaging the track for supporting the rotor arm during rotation of the rotor.

A preferred construction of the rotor arm provides a longitudinally extending space frame box truss having spaced frames of rectangular cross-section formed by four corners and four sides. A longitudinally extending airfoil is mounted within and arranged extending along the extent of the truss, with the airfoil extending transversely of the truss from a one corner of the truss to one of the two sides of the truss opposite the one corner. By adjustably attaching the airfoil to the one of the sides of the frames of the truss, the pitch of the airfoil between adjacent sections of the truss, as formed by the frames of the truss, may be varied as indicated for optimum efficiency of the airfoil.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a fragmentary, sectional view taken generally along the line 2—2 of FIG. 1.

FIG. 3 is a fragmentary, sectional view taken generally along the line 3—3 of FIG. 2, but drawn to a larger scale.

FIG. 4 is a perspective view showing a preferred rotor arm according to the present invention.

FIG. 5 is a sectional view taken generally along the line 5—5 of FIG. 4, but drawn to a larger scale.

FIG. 6 is a fragmentary, sectional view taken generally along the line 6—6 of FIG. 2.

DESCRIPTION OF THE PREFERRED EMBODIMENTS

Figure 1:
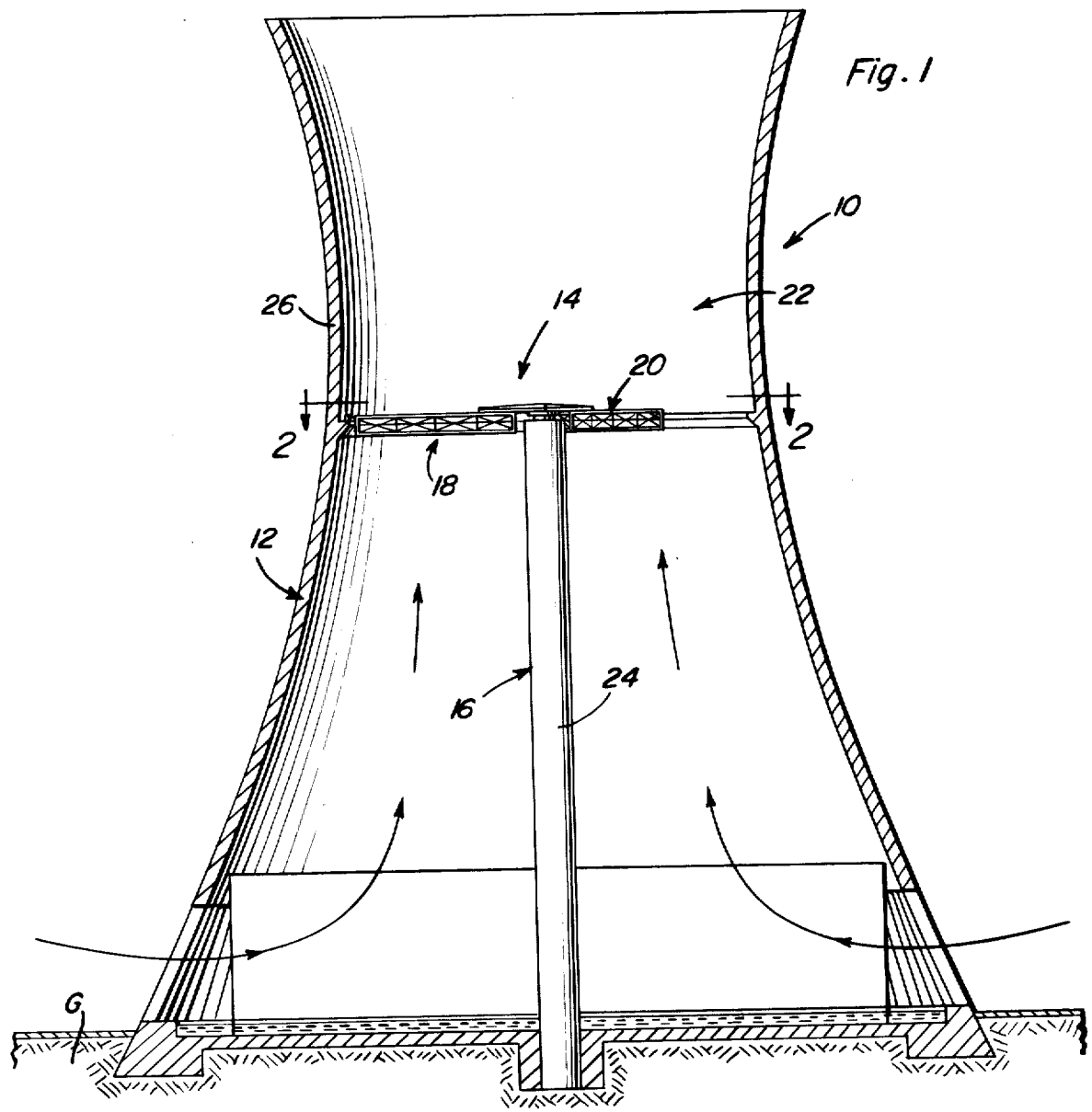
FIG. 1 is a schematic, vertical sectional view showing a wind driven electric power generator system according to the present invention arranged in an updraft hyperbolic natural draft cooling tower.

Referring now more particularly TO FIG. 1 of the drawings, an updraft natural draft cooling tower 10 having a hyperbolic veil 12 is shown provided with a wind driven electric generator system 14 according to the present invention. A support 16 is disposed within veil 12, while a wind generator assembly 18 is mounted on support 16 within the veil 12. A rotor 20 of assembly 18 is illustrated as arranged in the area of throat 22 of hyperbolic veil 12, although it is to be understood that the height of rotor 20 is to be selected by the best combination of cost and the average wind velocity in the area in which tower 10 is physically located. It will be found, however, that the optimum height for rotor 20 will usually place rotor 20 within the area of throat 22 of the veil 12.

As can be appreciated from FIG. 1, veil 12 forms a shroud which may be considered a longitudinal sleeve extending vertically from a supporting surface such as ground G. Further, support 16 is a vertically extending, stationary, longitudinal shaft 24 disposed substantially centrally within the sleeve, or veil 12, and also entered in ground G. In this manner, shaft 24 is protected from the frequently very high forces generated by lateral wind to which conventional, unshrouded windwill towers are exposed, and shaft 24, which may be constructed in a conventional manner from concrete, and the like, does not require the strength and stiffness of a comparable exposed windmill tower.

As can also best be seen from FIG. 1, veil 12 is provided with a hyperbolic inner surface 26 with which the outer ends of the arms of rotor 20 cooperate in a manner to be described below.

Referring now more particularly to FIG. 2 of the drawings, rotor 20 includes a rotor hub 28 which may be in the form of the illustrated spider, rotatably mounted on shaft 24, the latter being hollow, in a manner which will become clear below. One or more rotor arms are connected to rotor hub 28, with three rotor arms 30, 32, and 34 being illustrated as extending radially from the hub 28. These rotor arms 30, 32, and 34 are preferably of substantially identical construction, so that only the construction of a single rotor arm will be described below, and extend radially from hub 28 so as to be equally spaced about the rotor hub 28. Advantageously, guy wires 36, 38 and 40, and the like, are connected between the ends of rotor arms 30, 32 and 34 spaced from hub 28 in a conventional manner, such as by the illustrated turn buckles, for permitting the rotor 20 to be adjusted and rigidified.

Taking FIG. 3 together with FIG. 2, the inner wall surface 26 of veil 12 is provided with a circular track 42 supported by a ledge 43 formed on inner surface 26 of veil 12 and arranged arond the longitudinal axis of shaft 24 and opposite rotor hub 28. A trolley 44, 46, and 48 is associated with each of rotor arms 30, 32, and 34, respectively, at an end of the rotor arms 32, 34 spaced from rotor hub 28. As can be clearly seen from FIG. 3, each of these trolleys 44, 46, 48, with the disposition of trolleys 46 and 48 being identical to that of trolley 44 shown in FIG. 3, is arranged engaging tracl 42 for supporting the associated rotor arm 30, 32, 34 during rotation of rotor 20. In this manner, the lightweight rotor arms 30, 32, and 34, the construction of which will be discussed below, may be adequately supported against downward deflection when the length of each of the arms 30, 32, 34 is especially long and/or the wind velocity through veil 12 is especially low.

Referring now more particularly to FIGS. 4 and 5 of the drawings, each rotor arm 30, 32, and 34 advantageously is built around a longitudinally extending space frame box truss 50 having a plurality of spaced frames 52 of rectangular cross section formed by four corners and four sides. Cross braces 53 are arranged within the frames 52, or at the stations where the braces 53 and side members are disposed, while four stringers 54, 56, 58, and 60 are used to form the longitudinal extent of truss 50 and to connect together the frames 52, including braces 53. Connected to the stringers 54, 56, 58 and 60 at each station where a frame 52 is formed, are four sides 62, 64, 66, and 68, which cooperate with the braces 53 to form the frames 52. A longitudinally extending airfoil 70 is mounted within and extends along the extent of truss 50 with airfoil 70 extending transversely of truss 50 from a one corner of the truss, that formed by stringer 54, to one of the two sides of the truss opposite the corner formed by stringer 54, that being side 64 as can be readily seen in FIG. 5.

Airfoil 70 is adjustably attached to side 64 of frames 52 of truss 50 for permitting variation of the pitch of airfoil 70 between adjacent sections 72 of the truss 50 in order to achieve optimum efficiency of the airfoil 70.

Airfoil 70 is preferably constructed as the illustrated sheet 74 of flexible, substantially air impervious, material having spaced, substantially parallel, longitudinal edges 76 and 78. While sheet 74 may be constructed from a fabric or a sheet of synthetic material, the relatively large size of sheet 74 and the relatively great forces exerted on the sheet 74 make it particularly advantageous to construct sheet 74 from a suitable metal, such as stainless steel or other non-corrosive metal. As can be readily seen from FIG. 5, edge 76 of sheet 74 is anchored at spaced points to the stringer 54, forming one corner of truss 50, at each frame 52, and the edge 78 of sheet 72 is anchored to sides 64 of frame 52 of truss 50 at points outside 64 between a midpoint of side 64, the midpoint being where the perpendicular projections of the crossing point of bracing 80 fall on the side 64, and the corner of the frames 52 diagonally opposite the corner formed by stringer 54. This opposite corner is formed by stringer 58, as can be readily seen from FIG. 5. As can also be readily seen from FIG. 5, edge 78 of sheet 74 is attached to rail, or side, 64 of the frames 52 as by the illustrated eye bolt and nut arrangement 81 inserted in a hole provided in side 64. As will be readily appreciated, arrangement 81 may be readily moved along the extent of the rail forming side 64 in order to provide the desired pitch adjustment of airfoil 70.

Although not specifically shown in the drawings, it will be appreciated that airfoil 70 may also be constructed in a manner of an aircraft airfoil, having a similar cross-sectional configuration to the airfoils of aircraft and possibly even being provided with a rib and stringer construction in the manner of those conventional airfoils.

As can be seen from FIG. 6 of the drawings, shaft 24, which should be constructed so as to be corrosive resistent, is constructed as a stationary, hollow member, within which a conventional electric generator 82 is advantageously located directly beneath the center shaft S of rotor 20. Generator 82 is illustrated as being gear driven from the rotation of the "windmill" formed by rotor 20 as by a ring gear 83 cooperating with an internal ring R attached to hub 28 of rotor 20. A gear box 84 connected to shaft S and to generator 82 increases the relatively slow rotation of the windmill to a higher RPM more suitable for generator 82. Further, a conventional electromagnetic clutch 86, and the like, may be projected to a pinion 87 engaging ring gear 83 at one side of clutch 86 and to a conventional starter motor 88 at the other side of clutch 86 so as to selectively connect starter motor 88 to ring gear 83 and assist rotor arms 30, 32 and 34 to begin their start up initially after each shut down of the tower 10. This starter motor 88 would help overcome the inertia of rotor 20 and also help to obtain cooperating speeds that would be maintained by the flow of wind through veil 12. The geared connection between pinion 87 and the ring gear 83 would then be retracted electromagnetically, for example, by clutch 86 and all drag from starter motor 88 would thus be eliminated during normal operation of rotor 20.

The power generated by generator 82 would be transmitted as by lines 90 to the power grid (not shown) located nearby to supplement the power being generated by the main plant generator, or generators (not shown). Stairs 92, and the like, may be provided within shaft 24 in order to facilitate maintenance of genrator 82, and the equipment associated therewith, and rotor 20. Although not specifically illustrated in the drawings, removable catwalks, and the like, are advantageously provided for selective arrangement on each of the rotor arms 30, 32, 34 to facilitate movement along the arms by a workman (not shown) during maintenance of the generator system 14.

Although not specifically shown in FIG. 6, it will be appreciated that the stairs 92 will have associated therewith at least one platform in the vicinity of generator 82, and the other associated equipment, in order to facilitate maintenance of this equipment. For example, one working platform could be spaced just below generator 82 and additional platforms could be uniformly spaced on the remaining distance of shaft 24. Further, transmission lines 90 are advantageously run completely down the longitudinal extent of shaft 24 and out the bottom of the shaft 24 in an encased and protected manner preferably underground in a manner not shown in FIGS. 1 and 7. While starter motor 88 is a desirable and advantageous feature, it should be understood that such starter motor 88 is optional.

The aforementioned variable pitch for each section 72 of a rotor arm 30, 32, 34 wil be predetermined for each towe 10 within which generator system 14 is to be disposed.

Figure 7:
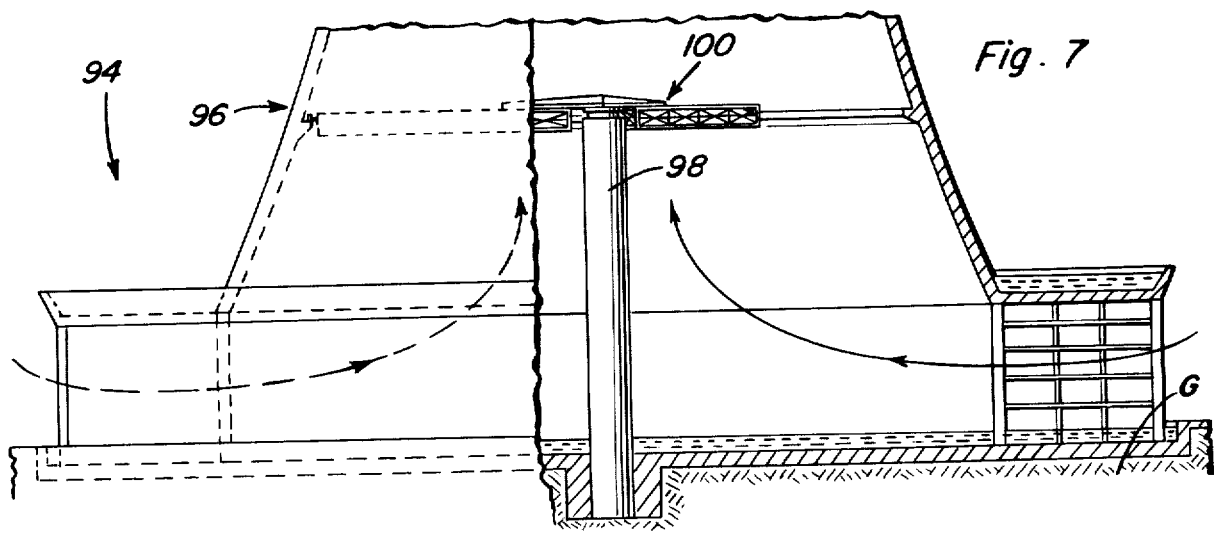
FIG. 7 is a fragmentary, elevational view, partly cut away and in vertical section, similar to the lower portion of FIG. 1, but showing a wind driven electric generator system according to the present invention arranged in a cross flow hyperbolic natural draft cooling tower, with the rotor of the generator system disposed in the lower portion of the veil of the cooling tower.

Referring now more particularly to FIG. 7 of the drawings, a crossdraft natural cooling tower 94 having a hyperbolic ceil 96 is illustrated as provided with a generator system according to the present invention which includes a shaft 98 supporting a rotor 100. Since the construction of shaft 98 and rotor 100 are essentially identical to shaft 24 and rotor 20 of generator sytem 14, the construction of such elements will not be described in detail herein. It should be noted, however, that rotor 100 is located in the lower portion of veil 96. While the rotors 20, 100 will most often be arranged in the throat area of a hyperbolic veil 12, 96, in some instances it may be advantageous to locate the rotor in, for example, the lower portion of the veil, as rotor 100 is arranged in veil 96. The determination of the location of the height of the rotor is to be selected by the best combination of area, wind velocity and cost.

Although the specific arrangement of the water discharging pipes and associated baffles for the cooling towers 10 and 94 have not been shown in any detail in FIGS. 1 and 7 of the drawings, it is to be understood that the construction of these pipes, baffles, and the association of the pipes and baffles with the ponds, is entirely conventional and well known. Generally, the baffles are constructed from a plurality of tiers of suspended sheets constructed from a film of synthetic material.

While any suitable material may be used to construct the track 42 on which trolleys 44, 46, and 48 travel, a suitable chrome steel, and the like, would be satisfactory. Further, trolleys 44, 46, and 48 should be provided with, for example, very efficient sealed bearings of conventional construction and not specifically illustrated in FIGS. 2 and 3 of the drawings.

It will be appreciated that a generator system according to the present invention is basically a windmill used to generate electricity, with the blades or arms of the windmill being arranged for being driven by a wind force moving in a vertical direction. The blades or rotary portion of the windmill is disposed in a horizontal plane, and is intended to be constructed inside a suitable shroud, such as the veil of a hyperbolic cooling tower which would provide the necessary updraft to move the blades or arms, of the rotor of the generator system. Such a system is applicable to all natural draft cooling towers regardless of their water flow scheme, and especially adapted to cooling towers employing a hyberbolic veil for achieving the optimum chimney effect. The size of the cooling tower is immaterial, for a generator system according to the present invention will work in all cooling towers from the smallest to the very largest. The structural and aerodynamic design of the rotor arms would be a function of the diameter, wind velocities, and materials available, with necessary corrosive resisting qualities being provided while retaining a lightweight and strong construction for the arms.

Most cooling towers are of sufficient diameter to justify long span rotors of a box spaced frame truss design provided with fabric or metal "sails" adjustably attached. While rotors of very short span may not require trolleys such as those designated 44, 46, and 48 in the illustrated embodiment, in general the space frame trusses would be of sufficient length to be supported on their outer end by such trolleys as well as supported on their inner ends by a center hub arrangement. As mentioned above, the trolleys should have highly efficient enclosed bearings and be arranged for rolling on a precision, for example, chrome steel track, and the like, attached to the inner surface of a, for example, concrete cooling tower veil.

Given a rotor for a generator system according to the present invention having a 36 foot diameter sweeping an area of 1,017.9 square feet, by using the formula of: $HHP = 0.00000214 \times V^3 \times \text{area}$, where $V$ is in feet per second and area is in square feet, a value of $V$ of 32.27 would deliver 71.83 horse power to a generator such as generator 82. The value 32.28 feet per second corresponds to a wind velocity of 22 miles per hour. Taking a conversion factor of 0.4941 KW per HP, 35.5 KW of electricity can be obtained from a generator system according to the present invention having a 36 foot diameter rotor in a 22 mile per hour wind, which permits a generator sytem according to the present invention to utilize otuewise wasted energy in a manner comparable to conventional windmills without regard to location of the wind driven generator system of the present invention. Although the energy used by a generator system as set forth herein will affect the performance of the cooling tower associated with the rotor, the effect will not be of any great consequence and can be readily compensated for by proper design of the tower and generating system.

Accordingly, the present invention provides a wind generator which may be placed in any location that assures a fairly constant wind movement of considerable mass and velocity. Further, the invention takes advantage of confined air at the rotor tips in the same way that a shroud does on certain other windmill-like structures. The "wind" velocity passing through the veil of the cooling tower will vary some due to the ambient temperature and the temperature of the water being cooled, but this variation is insignificant. With the present invention, no huge specially constructed tower is required. The center shaft will support its share of the weight of the rotors and will house or hold the electric generator and, if used, the associated starter motor. Lateral wind loads will not be a factor for the tower to support since the rotors are in a horizontal plane and are protected from outside winds by the cooling tower veil.

It should be noted that the allowable deflection of the rotor arms could be fairly large when inactive because there will be a countering uplift when they are in operation. This uplift weight could also be balanced to reduce friction at the bearing points formed by the engagement of the trolleys, such as those designated 44, 46, and 48, with the track, such as that designated 42, formed on the inner surface of the associated veil.

One of the greatest cost saving advantages of the present invention is that the wind driven electric generator system according to the invention can always be located where power grid and transmission network facilities are already a part of the main power generating installation with which the present generator system is associated.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. In combination with a cooling tower holding a liquid to be cooled and having a hyperbolic veil forming a throat area and a path for fluid flow through the veil, a wind driven electric power generator, comprising, in combination:
   a. a support disposed within the veil; and
   b. wind generator means mounted on the support within the veil for being actuated by the fluid flow through the veil and generating power, the veil being arranged extending vertically, and the support being a vertically extending, stationary, longitudinal shaft disposed substantially centrally within the veil and extending along the longitudinal extent of the veil, the veil having an inner wall surface, and the wind generator means including a rotor comprising, in combination:
      1. a rotor hub rotatably mounted on the shaft in the throat of the veil for rotation about an axis of rotation; and
      2. a rotor arm connected to the rotor hub and extending radially from the rotor hub to supportive engagement with the inner wall surface of the veil and forming means for being rotated about the shaft by the fluid flow through the veil, the flow being parallel to the axis of rotation of the rotor hub, wherein the inner wall surface of the veil is provided at the throat of the veil with a circular track defining a center through which passes an axis formed by the longitudinal extent of the shaft, and the circular track being disposed opposite the rotor hub of the rotor, and a trolley mounted on the rotor arm at an end thereof spaced from the rotor hub, the trolley being arranged engaging the track for supporting the rotor arm during rotation of the rotor.

2. A structure as defined in claim 1, wherein the rotor arm includes a longitudinally extending spaced frame box truss having spaced frames of a rectangular cross-section formed by four corners and four sides, and a longitudinal airfoil mounted within and extending along the extent of the truss, the airfoil extending transversely of the truss from a one corner of the truss to one of the two sides of the truss opposite the one corner.

3. A structure as defined in claim 2, wherein the airfoil is adjustably attached to the one of the sides of the frames of the truss for permitting variation of the pitch of the airfoil between adjacent sections of the truss.

4. A structure as defined in claim 3, wherein the airfoil is a sheet of flexible, substantially air impervious, material having spaced, substantially parallel, longitudinal edges, one of the edges being anchored at spaced points to the one corner of the frames of the truss, and the other of the edge being anchored to the frames of the truss at a side of the truss at a point thereon between a midpoint of the truss and the corner of the frame diagonally opposite the one corner.

5. A structure as defined in claim 4, wherein a plurality of rotor arms are connected to the rotor hub and are arranged extending radially from the rotor hub, the rotor arms being identical in construction and equally spaced about the rotor hub, and guy wires connected between ends of the rotor arms spaced from the rotor hub for rigidifying the rotor.

6. A structure as defined in claim 5, wherein the wind generator means further includes an electrical generator mounted within the shaft, the shaft being a hollow shaft, and gear box connected to the generator for permitting the generator to rotate at a higher number of RPMs than the number of RPMs at which the rotor is rotating.

7. A structure as defined in claim 2, wherein a plurality of rotor arms are connected to the rotor hub and are arranged extending radially from the rotor hub, the rotor arms being identical in construction and equally spaced about the rotor hub, and guy wires connected between ends of the rotor arms spaced from the rotor hub for rigidying the rotor.

* * * * *